(12) United States Patent
De Souza

(10) Patent No.: US 11,015,772 B1
(45) Date of Patent: May 25, 2021

(54) OUTDOOR LIGHTING ASSEMBLY

(71) Applicant: Reinaldo De Souza, Toronto (CA)

(72) Inventor: Reinaldo De Souza, Toronto (CA)

(*) Notice: Subject to any disclaimer, the term of this patent is extended or adjusted under 35 U.S.C. 154(b) by 0 days.

(21) Appl. No.: 16/942,936

(22) Filed: Jul. 30, 2020

(51) Int. Cl.
  *F21S 4/10* (2016.01)
  *F21S 9/03* (2006.01)
  *F21V 21/08* (2006.01)
  *F21V 23/06* (2006.01)
  *F21W 131/109* (2006.01)

(52) U.S. Cl.
  CPC ............... *F21S 4/10* (2016.01); *F21S 9/032* (2013.01); *F21V 21/0816* (2013.01); *F21V 23/06* (2013.01); *F21W 2131/109* (2013.01)

(58) Field of Classification Search
  CPC ............................ F21S 4/10; F21S 9/03–037
  See application file for complete search history.

(56) References Cited

U.S. PATENT DOCUMENTS

| 5,111,127 | A | 5/1992 | Johnson | |
|---|---|---|---|---|
| 6,296,374 | B1* | 10/2001 | Ahroni | F21S 4/10 362/249.16 |
| 7,273,294 | B2 | 9/2007 | Kao | |
| 7,508,163 | B2 | 3/2009 | Batts-Gowins | |
| 7,565,968 | B2 | 7/2009 | Lindley | |
| 7,661,838 | B2 | 2/2010 | Chen | |
| D793,338 | S | 8/2017 | Zheng | |
| 2017/0110896 | A1 | 4/2017 | Gissin | |
| 2019/0149088 | A1* | 5/2019 | Chaturvedi | H02J 7/35 320/101 |

FOREIGN PATENT DOCUMENTS

WO    WO2018170501    9/2018

* cited by examiner

*Primary Examiner* — Sean P Gramling

(57) ABSTRACT

An outdoor lighting assembly for illuminating a plurality of trees includes a box, which define an interior space. A battery, which is rechargeable, is positioned in the interior space. A solar panel is engaged to a top of the box and is operationally engaged to the battery. The solar panel charges the battery. A plurality of sockets is engaged to the box and is operationally engaged to the battery. Each of a plurality of strings of lights comprises a plug. The plug is selectively insertable into a respective socket to power the string of lights to illuminate an area proximate thereto.

8 Claims, 6 Drawing Sheets

OUTDOOR LIGHTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lighting assemblies and more particularly pertains to a new lighting assembly for illuminating a plurality of trees.

(2) Description of Related Art Including Information Disclosed Under 37 CFR 1.97 and 1.98

The prior art relates to lighting assemblies. Prior art outdoor lighting assemblies may comprise multiple electric plugs and outlets, an internal rechargeable battery, a solar panel, and a string of lights.

BRIEF SUMMARY OF THE INVENTION

An embodiment of the disclosure meets the needs presented above by generally comprising a box, which define an interior space. A battery, which is rechargeable, is positioned in the interior space. A solar panel is engaged to a top of the box and is operationally engaged to the battery. The solar panel is configured to charge the battery. A plurality of sockets is engaged to the box and is operationally engaged to the battery. Each of a plurality of strings of lights comprises a plug. The plug is selectively insertable into a respective socket to power the string of lights. The string of lights is configured to illuminate an area proximate thereto.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
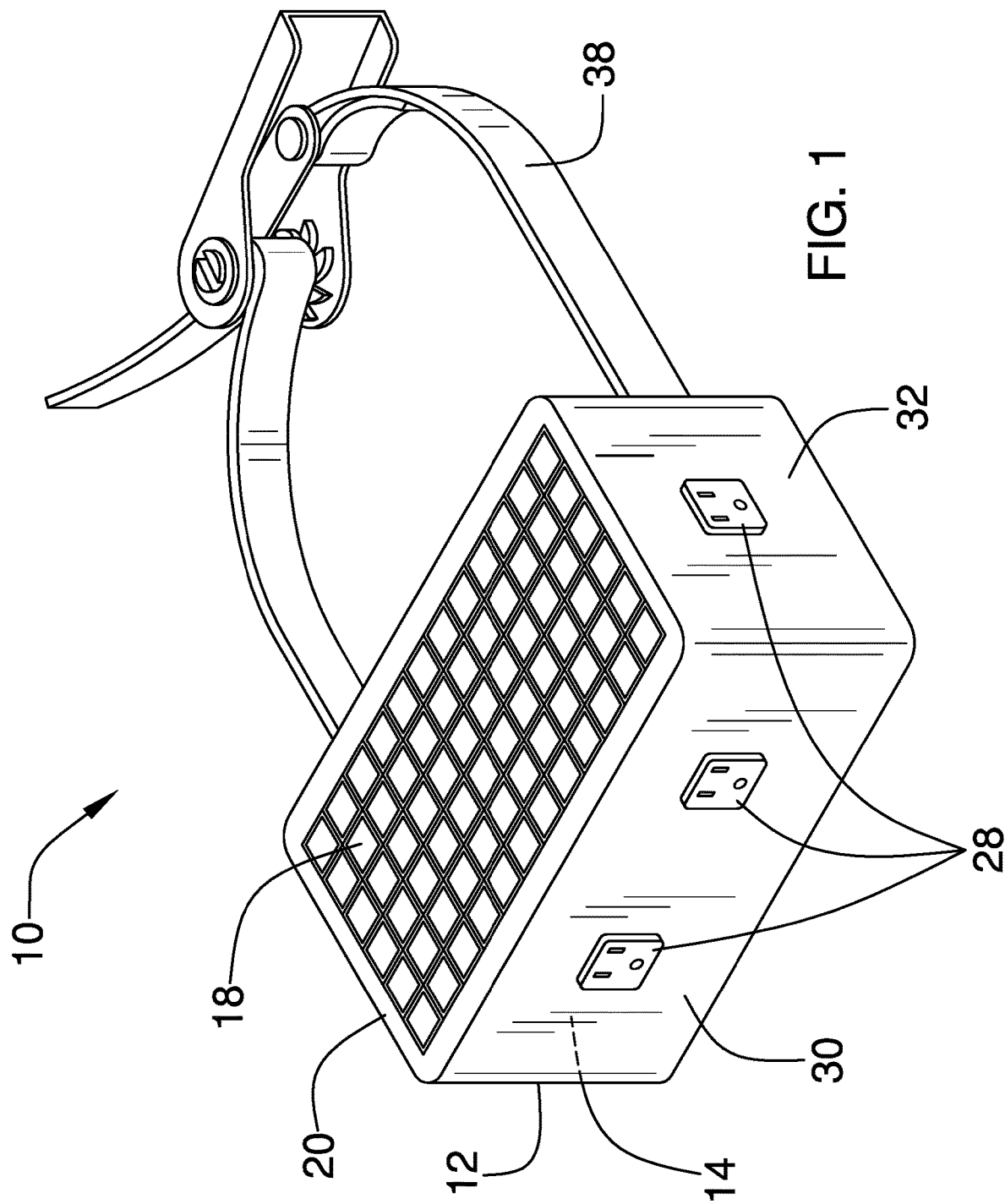
FIG. 1 is an isometric perspective view of an outdoor lighting assembly according to an embodiment of the disclosure.
Figure 2:
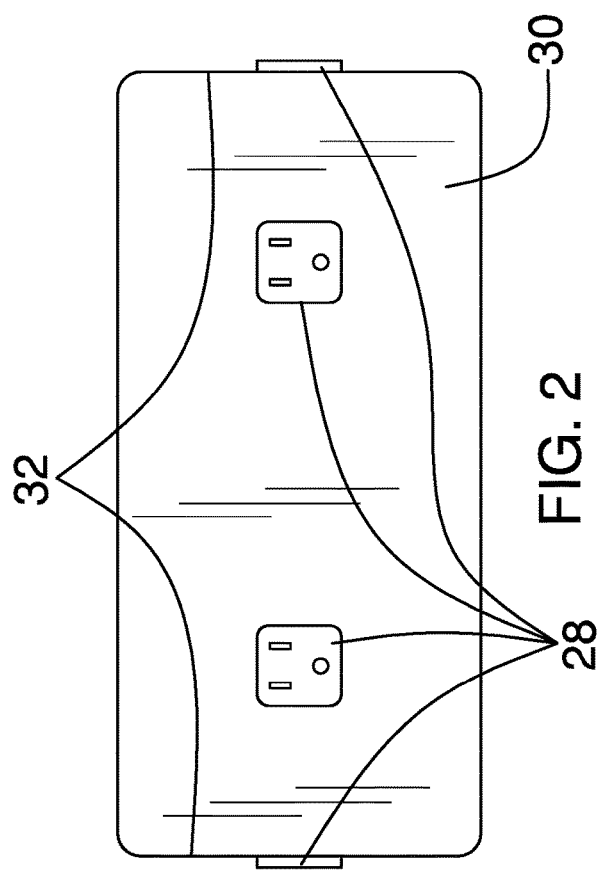
FIG. 2 is a front view of an embodiment of the disclosure.
Figure 3:
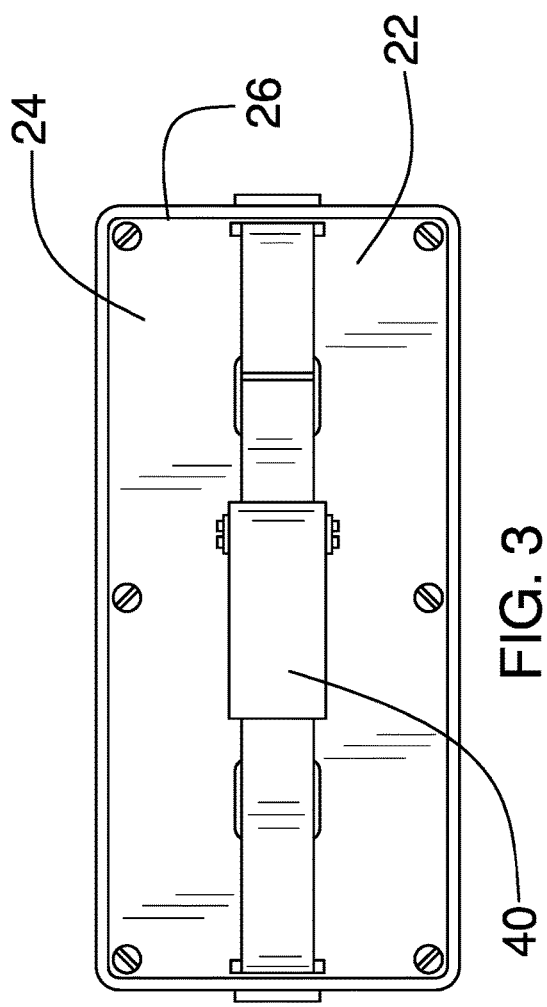
FIG. 3 is a rear view of an embodiment of the disclosure.

With reference now to the drawings, and in particular to FIGS. 1 through 7 thereof, a new lighting assembly embodying the principles and concepts of an embodiment of the disclosure and generally designated by the reference numeral 10 will be described.

As best illustrated in FIGS. 1 through 7, the outdoor lighting assembly 10 generally comprises a box 12, which defines an interior space 14. The box 12 is substantially impermeable to water. A battery 16, which is rechargeable, is positioned in the interior space 14. A solar panel 18 is engaged to a top 20 of the box 12 and is operationally engaged to the battery 16. The solar panel 18 is configured to charge the battery 16. The box 12 has a back 22 which has an aperture 24 positioned therein. A plate 26 is selectively engageable to the box 12 to close the aperture 24. The plate 26 is removable to access the interior space 14.

Figure 4:
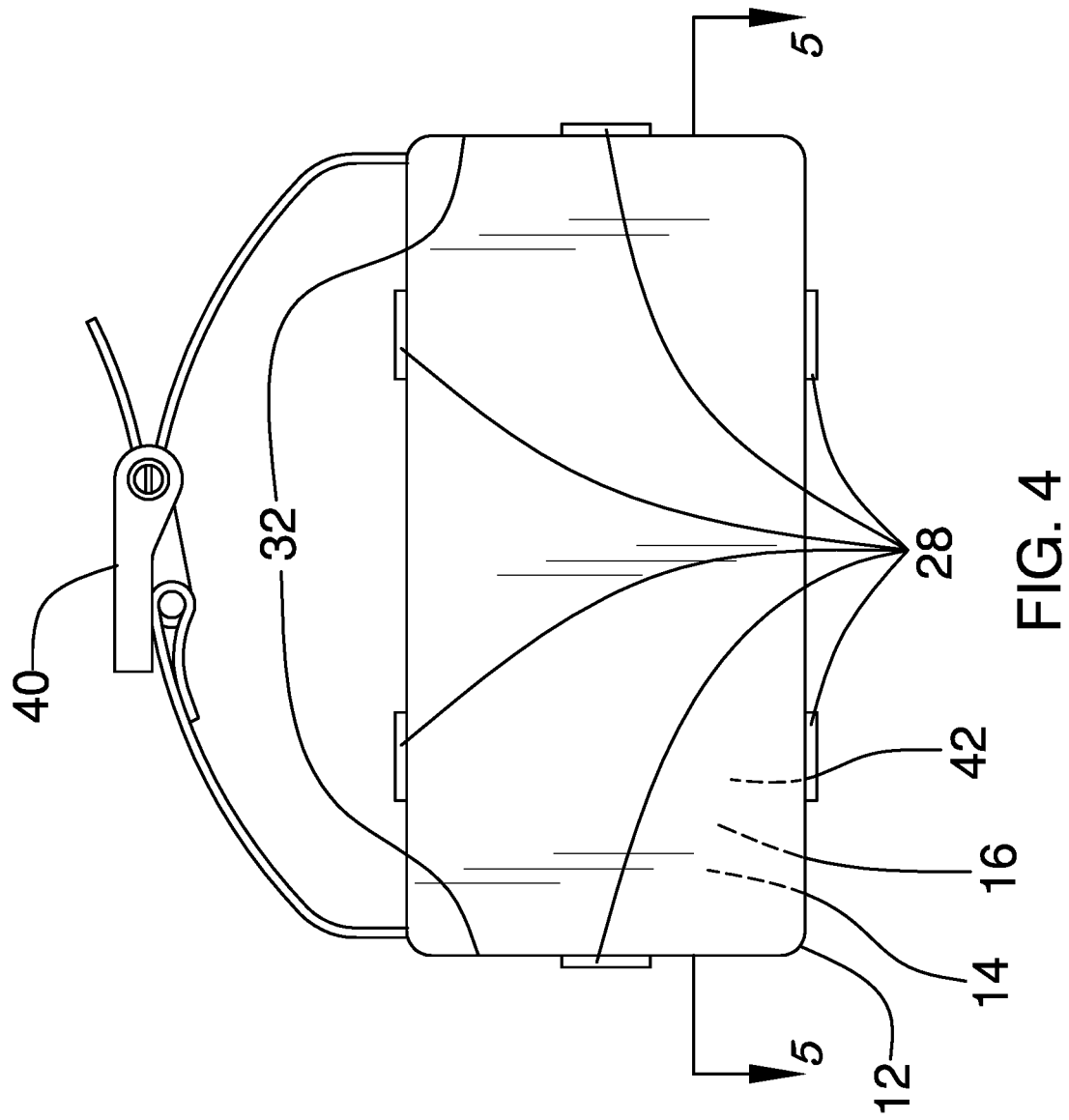
FIG. 4 is a bottom view of an embodiment of the disclosure.
Figure 5:
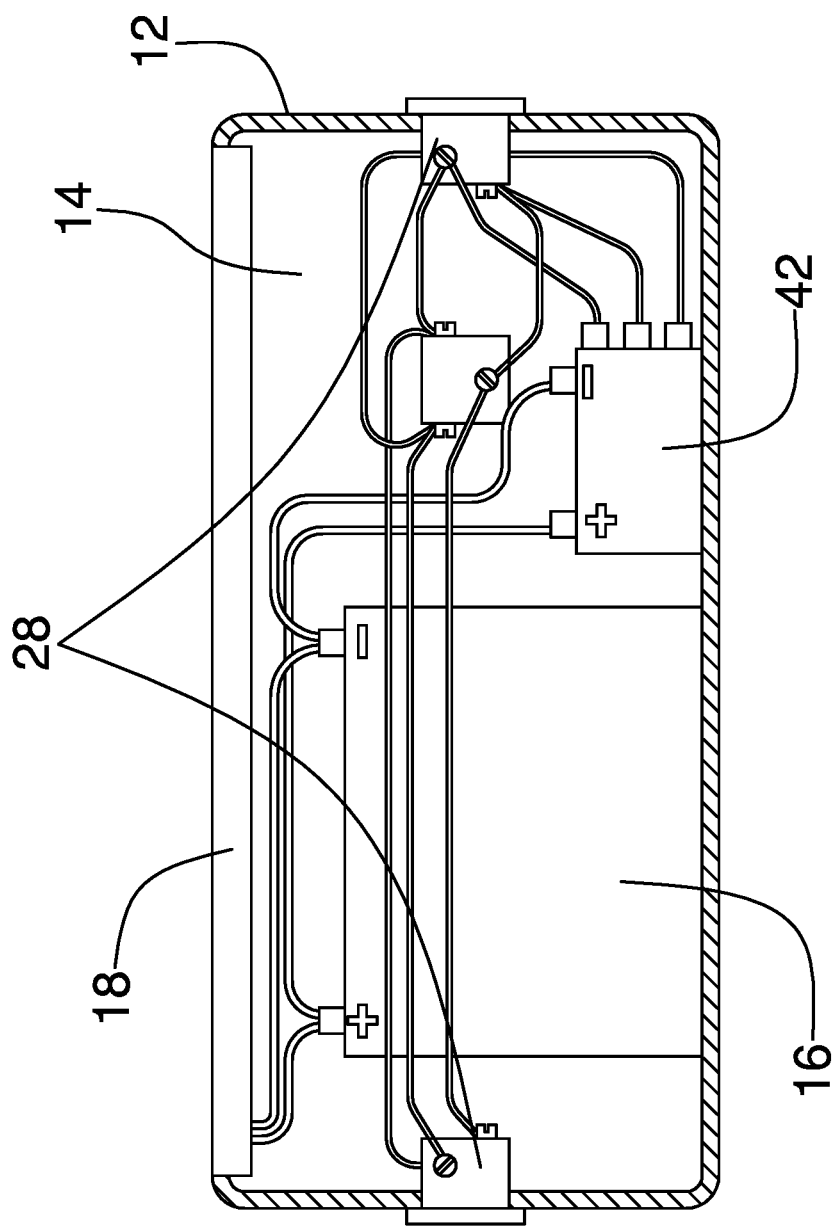
FIG. 5 is a cross-sectional view of an embodiment of the disclosure.
Figure 6:
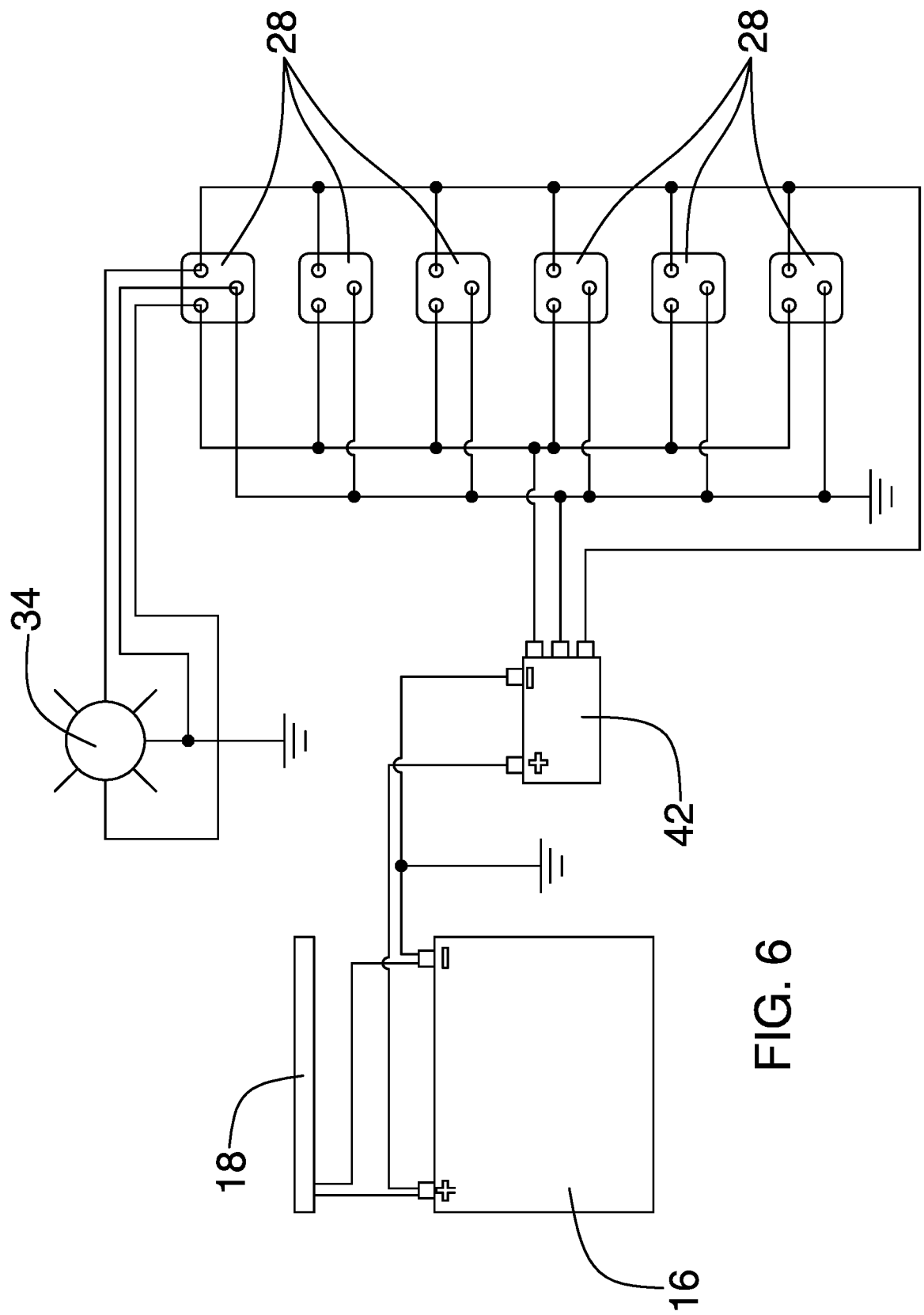
FIG. 6 is a block diagram of an embodiment of the disclosure.
Figure 7:
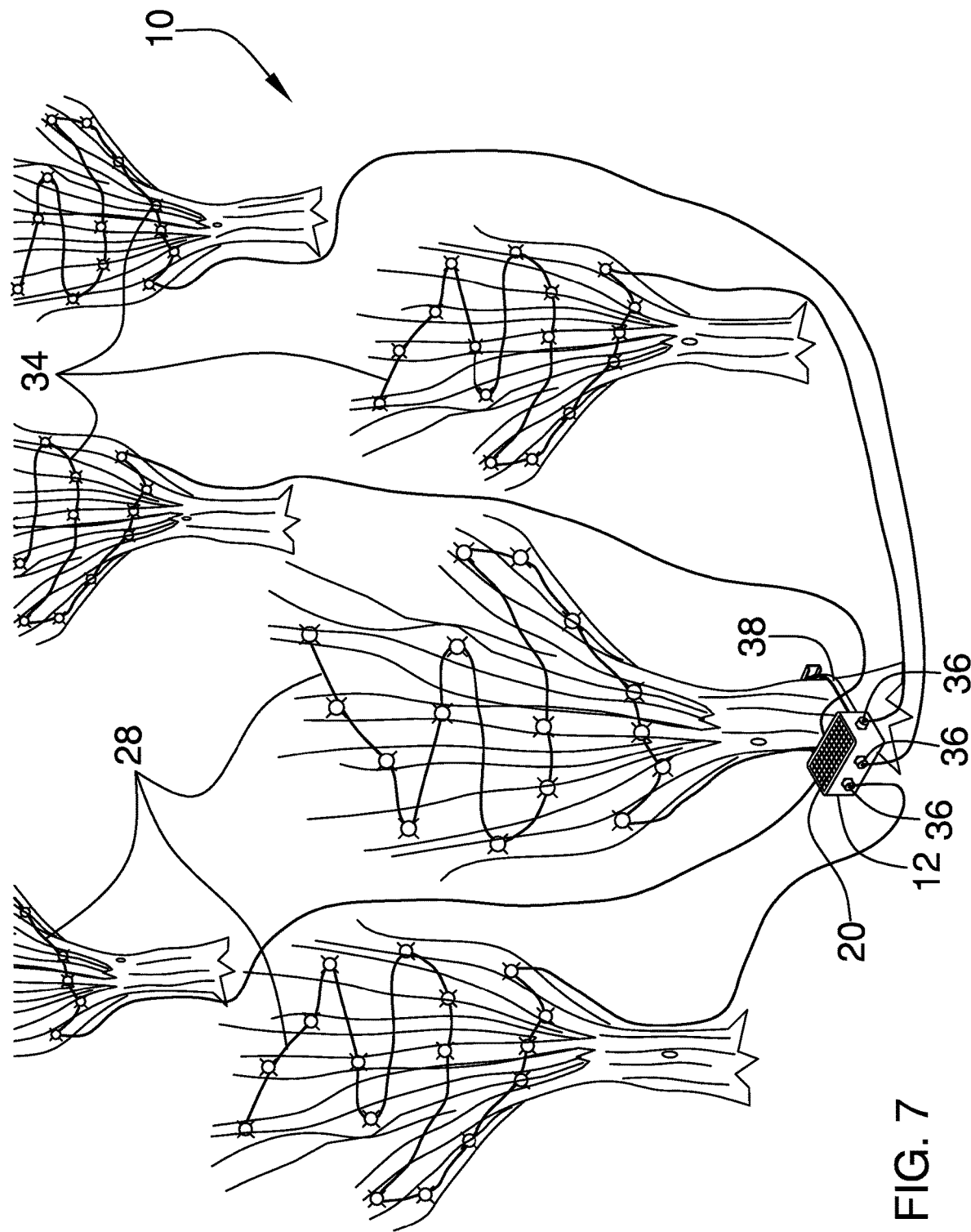
FIG. 7 is an in-use view of an embodiment of the disclosure.

A plurality of sockets 28 is engaged to the box 12 and is operationally engaged to the battery 16. The plurality of sockets 28 comprises from two to ten sockets 28. The plurality of sockets 28 may comprises six sockets 28, with the sockets 28 being positioned two apiece on a front 30 and the back 22 of the box 12 and singly on opposed sides 32 of the box 12, as shown in FIG. 4.

Each of a plurality of strings of lights 34 comprises a plug 36. The plug 36 is selectively insertable into a respective socket 28 to power the string of lights 34. The string of lights 34 is configured to illuminate an area proximate thereto.

A fastener 38 is engaged to the back 22 of the box 12 and is configured to fasten the box 12 to a substrate. The fastener 38 may comprise a ratchet strap 40, or other fastening means, such as, but not limited to, bungie cords, hook and loop connectors, and the like. The ratchet strap 40 is configured to be positioned around a vertical element, such as a tree, a post, and the like, and to be ratcheted to fasten the box 12 to the vertical element.

A power inverter 42 is engaged to the box 12 and is positioned in the interior space 14. The power inverter 42 is operationally engaged to the battery 16 and the plurality of sockets 28. The power inverter 42 is positioned to convert direct current from the battery 16 to alternating current to supply alternating current to plurality of strings of lights 34 via the sockets 28.

In use, the box 12 is positioned proximate to a plurality of trees that a user would like to illuminate. The strings of lights 34 are attached to the trees and the plug 36 of each string of lights 34 is engaged to a respective socket 28 to supply power to the string of lights 34. The solar panel 18 converts sunlight to an electrical current to charge the battery 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An outdoor lighting assembly comprising:
   a box defining an interior space;
   a battery positioned in the interior space, the battery being rechargeable;
   a solar panel engaged to a top of the box and being operationally engaged to the battery, wherein the solar panel is configured for charging the battery;
   a plurality of sockets engaged to the box and operationally engaged to the battery; and
   a plurality of strings of lights, each string of lights comprising a plug, such that the plug is selectively insertable into a respective socket for powering the string of lights, wherein the string of lights is configured for illuminating an area proximate thereto; and
   a fastener engaged to a back of the box and being configured for fastening the box to an object, the fastener comprising a ratchet strap, the ratchet strap having a pair of sections, each of the sections having a respective proximal end coupled to the box such that each strap section extends outwardly directly from the back of the box adjacent to a respective one of a pair of lateral sides of the box wherein the ratchet strap is configured for positioning around a vertical element and for ratcheting for fastening the box to the vertical element.

2. The outdoor lighting assembly of claim 1, wherein the box is substantially impermeable to water.

3. The outdoor lighting assembly of claim 1, further including:
   the box having a back, the back having an aperture positioned therein; and
   a plate selectively engageable to the box for closing the aperture, such that the plate is removable for accessing the interior space.

4. The outdoor lighting assembly of claim 1, wherein the plurality of sockets comprises from two to ten sockets.

5. The outdoor lighting assembly of claim 4, wherein the plurality of sockets comprises six sockets.

6. The outdoor lighting assembly of claim 5, wherein the sockets are positioned two apiece on a front and a back of the box and singly on opposed sides of the box.

7. The outdoor lighting assembly of claim 1, further including a power inverter engaged to the box and positioned in the interior space, the power inverter being operationally engaged to the battery and the plurality of sockets, such that the power inverter is positioned for converting direct current from the battery to alternating current for supplying alternating current to plurality of strings of lights via the sockets.

8. An outdoor lighting assembly comprising:
   a box defining an interior space, the box being substantially impermeable to water, the box having a back, the back having an aperture positioned therein;
   a plate selectively engageable to the box for closing the aperture, such that the plate is removable for accessing the interior space;
   a battery positioned in the interior space, the battery being rechargeable;
   a solar panel engaged to a top of the box and being operationally engaged to the battery, wherein the solar panel is configured for charging the battery;
   a plurality of sockets engaged to the box and operationally engaged to the battery, the plurality of sockets comprising from two to ten sockets, the plurality of sockets comprising six sockets, the sockets being positioned two apiece on a front and the back of the box and singly on opposed sides of the box,
   a fastener engaged to the back of the box and being configured for fastening the box to an object, the fastener comprising a ratchet strap, the ratchet strap having a pair of sections, each of the sections having a respective proximal end coupled to the box such that each strap section extends outwardly directly from the back of the box adjacent to a respective one of a pair of lateral sides of the box wherein the ratchet strap is configured for positioning around a vertical element and for ratcheting for fastening the box to the vertical element;
   a plurality of strings of lights, each string of lights comprising a plug, such that the plug is selectively insertable into a respective socket for powering the string of lights, wherein the string of lights is configured for illuminating an area proximate thereto; and
   a power inverter engaged to the box and positioned in the interior space, the power inverter being operationally engaged to the battery and the plurality of sockets, such that the power inverter is positioned for converting direct current from the battery to alternating current for supplying alternating current to plurality of strings of lights via the sockets.

* * * * *